June 21, 1960  A. E. LEWIS  2,941,836
TRAILER FOR MOTOR VEHICLES
Filed Dec. 9, 1955
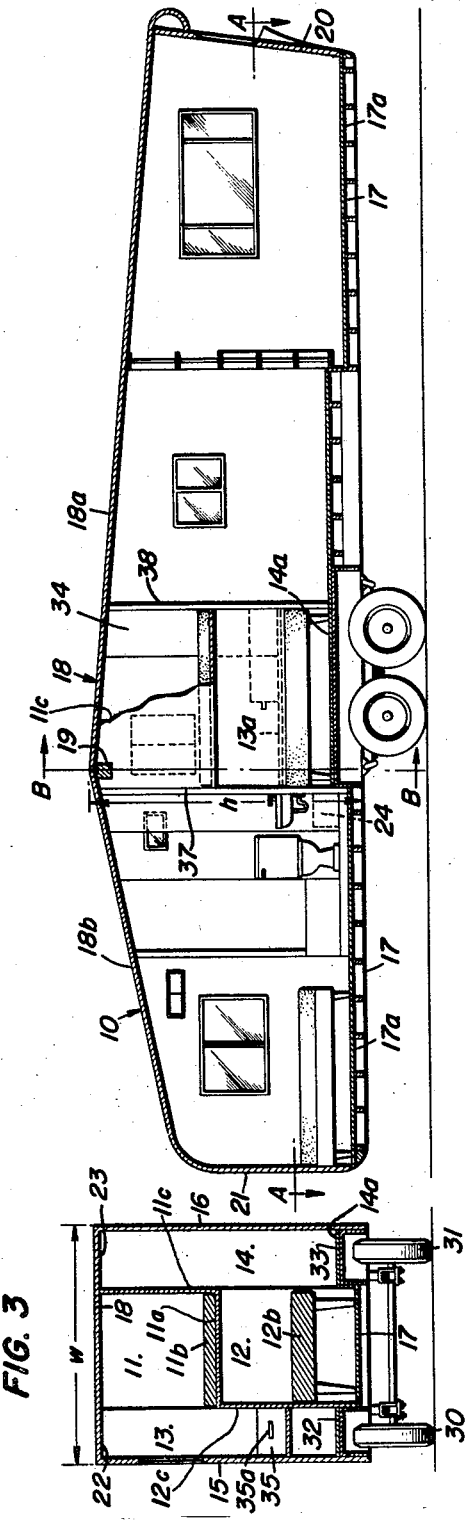
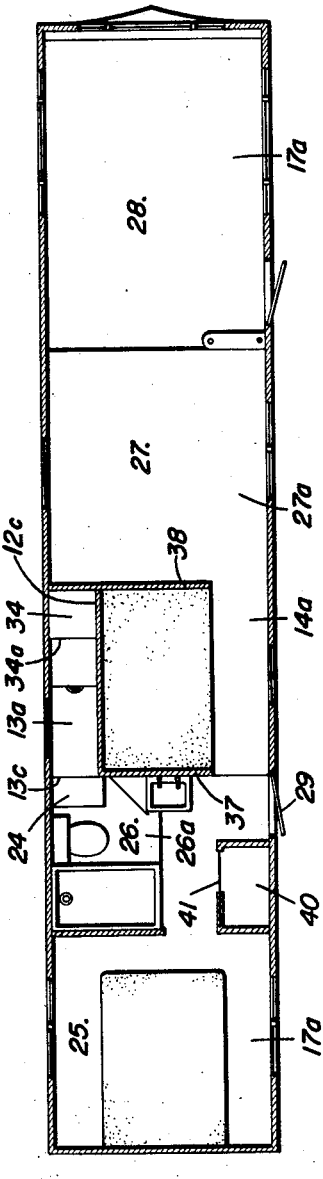
INVENTOR
ARCHIE E. LEWIS
ATTORNEY

# United States Patent Office 2,941,836
Patented June 21, 1960

2,941,836

TRAILER FOR MOTOR VEHICLES

Archie E. Lewis, Box 643, Grand Island, Nebr.

Filed Dec. 9, 1955, Ser. No. 552,089

4 Claims. (Cl. 296—23)

This invention relates to trailer vehicles, and more especially to trailer dwelling units which may be hitched to a motor vehicle for towing.

An object of the invention is the provision of a house trailer meeting dimensional requirements for use on highways, yet having a plurality of room levels and hall levels for occupants consistent with achieving separate room accommodations, compactness, and enabling ready access to and from the several rooms.

Another object of this invention is that of providing at reasonable cost a thoroughly practical trailer having easily accessible accommodations on different levels.

A further object of this invention is the provision of a house trailer having superimposed downstairs and upstairs rooms restricted to low headroom, thus to spare heighth of the trailer, and yet gain separate room space with these rooms disposed in direct communication with relatively high headroom space in such manner that the vertical and horizontal extents of the rooms are immediately added to by the relatively high headroom space for comfort and ease of movement.

Another object of this invention is to achieve a trailer in which superimposed rooms each having low headroom minimizing the necessary overall heighth of the trailer are annexed to halls which assure easy ingress and egress and in which the halls and rooms together are within permissible width requirements of the trailer.

Other objects of the invention in part will be obvious and in part pointed out more fully hereinafter.

The invention accordingly resides in the combination of elements, apparatus, and features of structure and in the relation of each of the same to one or more of the others as described herein, the scope of the application of which is indicated in the following claims.

In the drawings accompanying and forming part of the specification there is represented a preferred embodiment of the present invention. In way of further identification:

Figure 1 is a longitudinal vertical section of one of the trailers;

Figure 2 is a horizontal section of the trailer taken at line A—A in Figure 1; and Figure 3 is a maximum heighth, transverse vertical section of the trailer taken at line B—B in Figure 1.

As conducive to a clearer understanding of certain features of the present invention, it may be noted at this point that house trailers, being mobile units for draft attachment to a towing motor vehicle, now are in considerable demand to afford living quarters for occupants, particularly tourists. In the development of trailers a number of problems are encountered which are not always easy of solution in view of the many related considerations which must be accounted for, a foremost problem being that of staying within permissible outside dimensions applying to highway vehicles, this allied with providing desired facilities inside the vehicle founded on an adequate cubic content and advantageous use of this space. There are trailers in the prior art which, while including rooms in numbers and kind consistent with expected market demand, have an intolerably large cubic content accompanying the accommodations afforded, remembering that construction costs usually increase with the cubic content, giving rise to the need for establishing selling prices which are too high in the competitive market. There are instances too in the prior art where the reduction of cubic content has been at the very hurtful sacrifice of trailer comfort and freedom of movement between the rooms by occupants.

Among the house trailers in the prior art are those characterized by having upper and lower rooms carried on the same chassis. Trailers of this general sort have been prone to difficulty with excessive vehicle heighth. Also, the multiple level units heretofore have tended away from stability against over turning, and this importantly goes back to an existing need for achieving a tolerable outside heighth-width ratio characteristic while saving good properties of a plural level unit.

An outstanding object of this invention accordingly is the provision of a multiple level house trailer having a sensible heighth-width ratio for stability against over turning, the trailer lending itself to meeting outside dimension requirements for highway use, and which though having readily accessible and highly useful upper and lower rooms is characterized by volume needs which are quite tolerably low.

The house trailer provided in accordance with the present invention is characterized by superimposed compartments or rooms situated at upper and lower levels and having substantially less than full standing headroom inside alleviated by upper and lower hallways which afford adjacent substantially full standing headroom. The superimposed rooms may be bedrooms, though instead they may serve other purposes such as where the space on the lower level is sitting room space under bedroom space on the upper level. The upper and lower rooms of the superimposed group together reach from the trailer bottom substantially to the roof, and in affording low headroom inside, enable a very considerable reduction in the heighth of the trailer. The hallways advantageously are disposed longitudinally of the trailer along opposite outside walls of the latter and the superimposed rooms are between the hallways. The upper hallway serves the upper room space and the lower hallway serves the lower room space. By arranging the superimposed rooms in alcoved relation to the respective hallways and by making the hallways high enough for occupants to stand, the low headroom characteristics of the superimposed rooms are successfully alleviated. Thus, the hallways contribute materially to the space and utility of the alcoves and simplify ingress and egress. Preferably, the upper hallway passes along the majority of the length of the upper room or rooms which it serves, though in way of further example, the upper hallway floor may be a comparatively short top landing of a stairway from the lower level. The floor level of the upper hallway is between the levels of the floors of the superimposed rooms at a point giving standing headroom in that hallway and easy access upward to the upper room space from the hallway floor. An upper hallway floor level is best used which is within one-third to two-thirds of the distance between the levels of the floors of the superimposed rooms, and approximately half-way between the distance is preferred. The lower hallway floor level may be at the same level as the low level room floor if desired, though in certain embodiments these levels may advantageously be somewhat different. By providing the lower hallway with a substantially full standing headroom ceiling considerably above the ceiling of the low level room space already mentioned, an occupant of the hall has the option of crouching sufficiently to enter the space. The lower hallway also serves as a passage to other space in the trailer giving access to the upper hallway, such as will be explained more fully hereinafter.

Thus in the illustrative embodiment represented in the accompanying drawing, a trailer 10 is represented comprising a plural compartment structure having an upper bunk compartment or room 11 superimposed on a lower bunk compartment or room 12, there being opposite closed sides 11c and 12c corresponding to the compartments and the compartments being between end walls 37 and 38 of the plural compartment structure. These compartments or rooms advantageously have the longest of their horizontal dimensions in the direction of the length of the trailer to permit sleeping lengthwise of the trailer and to reduce necessary trailer width. Thus, beds 11b and 12b having their lengths along the length of the trailer are in the respective bunk rooms 11 and 12. Bed 11b is supported directly on the floor 11a of the upper room 11 and bed 12b is a leg-type unit having a sleeping surface considerably above the floor of room 12. If desired one or more of the beds may be built into the respective rooms. Hallways 13 and 14 extend longitudinally of the trailer just inside the trailer sidewalls 15 and 16, respectively, and individually flank rooms 11 and 12 which together rise between the hallways from the bottom 17 of the trailer to the trailer roof 18. The closed sides 11c and 12c of the compartments partition the compartments or rooms 11 and 12 from the hallways, while opposite open sides of the compartments lead into the hallways for access. The roof in the present embodiment advantageously is at its highest over the rooms or compartments, such as by having a ridge pole 19 just above entrance 13c to hallway 13 for headroom and extending laterally of the trailer body, and shed roof sections 18a and 18b sloping downward from the ridge respectively to the front wall 20 and back wall 21 of the trailer.

Hallway 13 rises to a ceiling 22 immediately under the roof 18, thus flanking room 11 and placing the latter in alcove relation, and this same hallway has a floor 13a substantially lower than the floor of room 11 and substantially above the floor level of hallway 14. Accordingly, hallway 13 is made of such vertical extent as to permit an occupant to stand at least in a crouched position and readily gain access to the space of room 11 from the standing position. Hallway 13 preferably comes to a dead end a short distance behind the forward end of room 11. More specifically, the hallway is associated with a storage closet 34, the latter having an access door 34a opening into the terminal end of the hall. A pull-out step 35 is suitably guided into space under the closet 34 to disappear flush with the door wall of the closet and having a handle 35a so that the step may be extended out into the hallway to afford a riser and a tread upward toward room 11 above the hallway floor 13a.

The lower hallway 14, in having a floor 14a considerably below the floor of the upper hallway, flanks room 12 putting it in an alcove relation, and extends conveniently all the way to a ceiling 23 immediately under the trailer roof to afford standing space and space for an occupant to stoop into the room 12, such as to lie down on a bed or to sit on a seat as the case may be. The lower hallway also communicates with other substantially full standing headroom space along the length of the trailer and across the width of the trailer from which a stairway 24 rises from the floor of bathroom 26 to the floor 13a of hallway 13.

Immediately at the rear of the trailer a bedroom 25 is provided in communication with the bathroom 26 and thence hallway 14, which on forward opens into kitchen-dinette accommodations 27, and the kitchen-dinette in turn is open to a living room 28 situated immediately at the front end of the trailer. All of the downstairs rooms just named, as well as hallway 14 have substantially full standing heighth headroom. Bottom 17 of the trailer supports a main floor 17a which if desired may be the finished floor of the entire downstairs of the trailer. As represented, however, floor 17a advantageously is on a lower plane as compared with certain floor areas of the downstairs. Thus, for example, floor 17a is in evidence throughout the trailer end rooms 25 and 28 where headroom has substantially diminished under the rake of roof 18, and also is in evidence in that end of the bathroom 26 which is adjacent to outside doorway 29 thus keeping the floor access level low with respect to the ground. The other end of the bathroom, however, has a floor 26a raised by a short step above the floor 17a so as to accommodate fixture waste pipes and supply pipes under the raised floor, floor 17a locally acting as a subfloor under the pipes, the space so formed for example being packed with insulation to prevent freezing. Stairway 24 rises from floor 26a. The floor 14a of hallway 14 and floor 27a of the kitchen-dinette 27 also are in a raised plane a short step above floor 17a. This likewise enables supply pipes and waste pipes associated with the kitchen fixtures to be housed under the floor 27a, floor 17a locally acting as a subfloor under the pipes and conveniently supporting protective insulation for the pipes.

A storage closet 40 preferably is disposed between the inside wall of bedroom 25 and outside doorway 29, and the closet conveniently has a sliding access door 41. Bathroom 26 is readily excluded for privacy from all of the adjoining rooms such as by sliding doors (not shown) closing bedroom 25 and halls 13 and 14 at the bathroom walls.

Wheels 30 and 31 of the trailer extend through suitable openings in floor 17 just inside the walls 15 and 16, thus effectively lowering the center of gravity of the vehicle. Guards or fenders 32 and 33 are mounted on floor 17 and close off the inside of the vehicle from the wheels and wheel openings. The raised floor 14a of hallway 14 extends above fender 33, and the space beneath floor 13a of hallway 13 houses the fender 32. The hallway floors accordingly are positioned to avoid obstruction by the fenders. The raised hallway 14a need in no manner interfere with having the level of floor 17a prevail in room 12 of the superimposed rooms where heighth added to the room in this manner is desired.

Trailers in accordance with the present invention are conveniently produced consistent with existing requirements on highway vehicles. The superimposed rooms, and the hallways which serve them, lend themselves to useful, practical widths which together still assure achieving a tolerable overall width of the trailer. For a given overall width, the low headroom properties of the superimposed rooms enable a considerable reduction in overall heighth, thus improving the vehicle heighth-width ratio and stability of the vehicle. An approximate 1:1 heighth-width vehicle body dimension ratio not only is entirely possible but is preferred, applying to a transverse vertical section taken through the vehicle body at the highest roof point, where height is outside heighth $h$ of the section and $w$ is the width of the base of the section. This will be more fully understood by referring to the illustrative embodiment represented in the accompanying drawing. In the latter instance, the transverse vertical section includes the ridgepole 19 and $h$ and $w$ respectively apply to the outside heighth and base width of that section. By supporting the vehicle body to the wheels and by providing at least one floor level below the tops of wheels, as preferred, the center of gravity of the entire vehicle in this manner is lowered, contributing to stability against upset.

Thus it will be seen that with this invention, the various objects noted herein together with many thoroughly practical advantages are successfully achieved. It will be noted that the trailers have multiple level room accommodations together with highly worthwhile improvements furthering the multiple level trailer art from such standpoints as better justifying this general class of vehicle, overcoming previous shortcomings and making competitive sale possible.

As many possible embodiments of the invention may be made and as many possible changes may be made in the embodiment hereinbefore set forth, it will be distinctly understood that all matter described herein is to be interpreted as illustrated and not as a limitation.

I claim:

1. A house trailer consistent with heighth and width requirements for highway use, comprising superimposed rooms each having substantially less than full standing headroom inside and together extending substantially the full inside heighth of the body of said trailer, upper and lower hallways lengthwise along the opposite outside sidewalls of said trailer and widthwise separating said rooms from said sidewalls, said rooms and hallways having floors and ceilings within the body of the trailer, road wheels, the floors of said hallways being over said road wheels, the floor of the upper of said hallways being lower than the floor of the upper of said rooms and higher than the floor of the lower of said hallways, the floor of the lower of said rooms being situated between said road wheels and being lower than the floors of both of said hallways, the upper of said rooms having an entrance off the upper of said hallways between the ceiling of the upper of said hallways and the floor of the upper of said rooms, and the lower of said rooms having an entrance off the lower of said hallways between the ceiling of the lower of said hallways and the floor of the lower of said hallways, the ceiling of the lower of said hallways and the floor of the upper of said hallways being vertically separated a distance exceeding the vertical distance between the floor and ceiling of the upper of said rooms, the distance between the floor and ceiling of the upper of said hallways measured adjacent to the entrance to the upper of said rooms being greater than the maximum distance between the floor and ceiling of the upper of said rooms, for the upper of said hallways to tolerate standing approach followed by upward and inward access through the entrance of the upper of said rooms to the upper of said rooms, and the distance between the floor and ceiling of the lower of said hallways measured adjacent to the entrance to the lower of said rooms being greater than the maximum distance between the floor and ceiling of the lower of said rooms, for the lower of said hallways to tolerate standing approach followed by downward and inward access through the entrance of the lower of said rooms to the lower of said rooms, and an end affording room space off said hallways having entrances to said hallways, said end having a floor lower than the floor of the upper of said hallways and a ceiling higher adjacent said entrances to said hallways than the floor of the upper of said rooms.

2. A house trailer as defined in claim 1, in which the floor of the upper of said hallways is approximately one-third to two-thirds the distance between the floors of said rooms higher than the floor of the lower of said rooms.

3. A house trailer consistent with heighth and width requirements for highway use, comprising a roof having higher and lower portions, opposite outside sidewalls, superimposed rooms each having substantially less than full standing head room inside and together extending substantially the full inside heighth of the body of said trailer and having ceilings and floors under the high portion on said roof, upper and lower hallways having ceilings and floors under said roof, said hallways extending lengthwise along the opposite outside sidewalls of said trailer and widthwise separating said rooms from said sidewalls, road wheels, the floors of said hallways being over said road wheels, the ceiling of the upper of said hallways, and the ceiling of the upper of said rooms being relatively high as compared with the lower portion of said roof, the ceiling of the lower of said hallways and the floor of the upper of said hallways being vertically separated a distance exceeding the vertical distance between the floor and ceiling of the upper of said rooms, the floor of the upper of said hallways being lower than the floor of the upper of said rooms and higher than the floor of the lower of said hallways, the floor of the lower of said rooms being situated between said road wheels and being lower than the floors of both of said hallways, the upper of said rooms having an entrance off the upper of said hallways between the ceiling of the upper of said hallways and the floor of the upper of said rooms, and the lower of said rooms having an entrance off the lower of said hallways between the ceiling of the lower of said rooms and the floor of the lower of said hallways, the distance between the floor and ceiling of the upper of said hallways measured adjacent to the entrance to the upper of said rooms being greater than the maximum distance between the floor and ceiling of the upper of said rooms, for the upper of said hallways to tolerate standing approach followed by upward and inward access through the entrance of the upper of said rooms to the upper of said rooms, and the distance between the floor and ceiling of the lower of said hallways measured adjacent to the entrance of the lower of said rooms being greater than the maximum distance between the floor and ceiling of the lower of said rooms, for the lower of said hallways to tolerate standing approach followed by downward and inward access through the entrance of the lower of said rooms to the lower of said rooms, and an end under the low portion of said roof affording room space off said hallways having entrances to said hallways, said end having a floor lower than the floor of the upper of said hallways and a ceiling higher adjacent said entrances to said hallways than the floor of the upper of said rooms.

4. A house trailer comprising a body having sidewalls, a plural sleeping compartment structure inside said body and including closed opposite ends and upper and lower superimposed bunk sleeping compartments between said ends, said compartments each being of less than full standing heighth and having individual hallways extending lengthwise of the trailer body inside the sidewalls of the body and permitting access to the compartments through opposite open sides of the compartments, said compartments each being partitioned off from the non-access hallway, at least one of said hallways being in communication with one side of a room of full standing heighth disposed adjacent to one of said ends of said plural compartment structure, and the other of said hallways being in communication with another room of full standing heighth located adjacent to the other of said ends of said plural compartment structure and also being accessible from the first one of said hallways, the floor of said other of said hallways being disposed at an elevation higher than the floor of the first hallway and lower than the floor of the upper of said compartments.

References Cited in the file of this patent

UNITED STATES PATENTS

| D. 164,167 | Grossniklaus | Aug. 7, 1951 |
| 1,798,542 | Koch et al. | Mar. 31, 1931 |
| 2,589,894 | Ten Eyck | Mar. 18, 1952 |
| 2,743,955 | Willson | May 1, 1956 |

OTHER REFERENCES

The Architectural Record, July 1936, pages 64–65.